US008842135B2

(12) United States Patent
Jancourtz

(10) Patent No.: US 8,842,135 B2
(45) Date of Patent: Sep. 23, 2014

(54) IMAGE EDITING SYSTEM AND METHOD FOR TRANSFORMING THE ROTATIONAL APPEARANCE OF A SUBJECT

(76) Inventor: Joshua Morgan Jancourtz, Mountainside, NJ (US)

( * ) Notice: Subject to any disclaimer, the term of this patent is extended or adjusted under 35 U.S.C. 154(b) by 337 days.

(21) Appl. No.: 13/424,198

(22) Filed: Mar. 19, 2012

(65) Prior Publication Data
US 2012/0262474 A1 Oct. 18, 2012

Related U.S. Application Data

(60) Provisional application No. 61/453,631, filed on Mar. 17, 2011.

(51) Int. Cl.
| | | |
|---|---|---|
| G09G 5/00 | (2006.01) | |
| H04N 1/387 | (2006.01) | |
| H04N 1/46 | (2006.01) | |
| G06K 9/36 | (2006.01) | |
| G06K 9/32 | (2006.01) | |
| G06K 9/03 | (2006.01) | |
| G06F 3/048 | (2013.01) | |
| G06T 3/40 | (2006.01) | |

(52) U.S. Cl.
CPC .................... *G06T 3/4007* (2013.01)
USPC ........... 345/657; 345/619; 345/606; 358/537; 358/452; 382/276; 382/296; 382/300; 382/309; 715/764

(58) Field of Classification Search
USPC .................. 345/418–419, 619, 629, 606, 643, 345/652–657, 658, 660, 672, 592; 358/525, 358/537–540, 448, 452; 382/254, 276, 282, 382/293, 295–300, 307, 309, 311; 715/700, 715/722, 764–765, 961, 965
See application file for complete search history.

(56) References Cited

U.S. PATENT DOCUMENTS 6,393,162 B1 * 5/2002 Higurashi ...................... 382/284
2008/0246757 A1 * 10/2008 Ito ................................ 345/419

* cited by examiner

*Primary Examiner* — Wesner Sajous
(74) *Attorney, Agent, or Firm* — Stroock & Stroock & Lavan LLP

(57) ABSTRACT

Methods and systems of editing a set of images depicting a subject displayed at a plurality of rotational angles is disclosed, comprising defining degrees of angular rotation of the subject about a rotational axis; selecting a subset of images based on the degrees of angular rotation of the subject depicted in the subset; determining image transformation values for the subset; determining interpolated image transformation values by interpolating the image transformation values for at least one of the images in the image set based on the image transformation values for the subset; and transforming at least one of the images in the set based on the image transformation values, and/or the interpolated image transformation values. The methods and systems may further comprise transforming the other images in the set based on both the image transformation values and the interpolated image transformation values, so they appear more precisely centered.

20 Claims, 7 Drawing Sheets

Tilt Correction At Lower Camera Angles

Tilt Analysis

STEP 401: Set a transform point for image rotation that corresponds to the perceived rotational point of subject tilt. For example, if the subject is a cylinder and it has been centered at its base, choose a point in the middle of the base as a rotation transform point.

STEP 402: Find the image where the subject appears least tilted, as it is leaning either directly towards or away from the camera. Define this subject rotational angle as the "vertical alignment rotational offset", which is the number of degrees from the "front" image defined as 0 degrees.

Calculation of Maximum Rotational Offset

STEP 403: The images at subject rotational angles 90 degrees in either direction from this image will appear most tilted. Use one or both of these images to determine the "maximum rotational offset" such that rotating the images toward a vertical position by this value will make them appear vertical.

Interpolation

STEP 404: Values for rotational offset parameters can now be interpolated for all images using the formula:
rotationalOffset(subjectRotationalAngle - verticalAlignmentRotationalOffset) = maxRotationalOffset * sin(subjectRotationalAngle - verticalAlignmentRotationalOffset)

Adjustments

STEP 405: Tweak parameter values such as vertical alignment rotational offset, transform point location, etc. if different results are desired.

Fig. 4

IMAGE EDITING SYSTEM AND METHOD FOR TRANSFORMING THE ROTATIONAL APPEARANCE OF A SUBJECT

CROSS-REFERENCE TO RELATED APPLICATIONS

The present application is a continuation-in-part of U.S. Provisional Application Ser. No. 61/453,631 filed on Mar. 17, 2011, the entirety of its disclosure being incorporated by reference herein.

FIELD OF THE INVENTION

The present invention relates to a computer system and method for editing a series of images of a subject at different angles so that the subject appears to be more precisely centered on a point of rotation, or de-centered in another desired manner.

STATEMENT OF THE PROBLEM

When viewing a set of multi-angle images of a subject, it may be considered preferable for the subject to appear centered on a point of rotation so as to appear rotating in a balanced manner.

All the images in a set of multi-angle images can be said to make up an "image set". An image set may comprise a single "image row" of images, which may be defined as a group of images of a rotating subject where the camera is at a fixed angle, for example, a fixed longitudinal angle. (Conceptually, an image row may alternatively be thought of as a group of images where the camera rotates longitudinally around a fixed subject.)

In addition, an image set may consist of more than one image row, allowing the user to view a subject rotating from more than one camera angle.

Capturing a set of multi-angle images of a rotating subject typically requires precisely centering the subject on its axis of rotation so that it will appear centered and balanced within an image frame when being viewed.

As an image set may include varying camera angles, it may likewise be considered preferable to keep the subject centered within the image frame when viewed at different camera angles.

Physically centering a subject on a platform with precision can be a difficult process. Even with the aid of alignment tools, it may be difficult to achieve an alignment that looks precisely balanced when an image set is viewed.

It may be cumbersome and time-consuming to physically center a subject precisely, even when a desired center point of the subject and axis can be identified. For example, if the subject is small, delicate, heavy, or surrounded by an interfering structure.

It may be easier to determine the center position of a perfectly symmetrical subject than a non-symmetrical subject, but a correspondingly greater degree of precision will be required for the resulting image set to appear well balanced when viewed.

It may be desirable to center a generally non-symmetrical subject on one of its symmetrical parts. This symmetrical part may be visually obscured at some angles by the rest of the subject, making precise physical centering of it difficult. Or it may be difficult or impossible to position the subject so that the symmetrical part is aligned as desired on the rotational axis.

Even if a subject is physically centered to satisfaction, it may be decided after the image capture process that another center point or axis is desirable.

Even after a set of images of a subject has been captured depicting the subject rotating around a point or axis within the subject, it may be desirable to transform the image set to make it appear as though the subject is rotating around a circle or other path outside the original center point.

Manually editing the images in an image set to appear well centered is a time consuming process that typically involves setting up alignment guides and then translating and scaling each image to appear balanced within the guides.

There may be dozens or hundreds of images to edit in such a manner, all of which should appear to flow smoothly from one to another. This process can be time consuming and tedious.

The editing process may involve some subjective decisions. For example, if the subject does not have a central symmetrical area, it may be necessary to subjectively determine the amount of scaling necessary to make the subject appear to match other images (or in three-dimensional (3D) terms, centered along the z axis), if it is too difficult or time consuming to calculate the exact amount of scaling required.

As the images in an image set portray a precise physical phenomenon of rotation, the edited image parameters should ideally be "smooth" throughout the image set (i.e. definable by a mathematical function). Manually editing an image set as described, however, is bound to lead to some form of deviation and error. This deviation may lead to results that are visually less satisfactory than edits made with parameters derived from mathematical functions or a data fitting process.

Therefore what is needed is a system and method for editing an image set so that the subject appears more precisely centered on a point of rotation, or de-centered in another desired manner.

SUMMARY OF THE INVENTION

The present invention therefore provides a system and method for editing a set of images so that they appear to be more precisely centered on a rotational axis, centered on the camera's rotational axis, or optionally de-centered in another desired manner. In addition, the present invention provides a means for making the set of images appear more accurately aligned along an axis of rotation or point, or un-aligned in another desired manner.

In one exemplary embodiment, a method of editing a set of images depicting a subject displayed at a plurality of rotational angles is disclosed, comprising at least one of sequential, non-sequential, and sequence independent steps comprising: defining degrees of angular rotation of the subject about a rotational axis; selecting a subset of images within the set of images based on the degrees of angular rotation of the subject depicted in the subset of images; determining image transformation values for the subset of images; determining interpolated image transformation values by interpolating the image transformation values for at least one of the images in the image set based on the image transformation values for the subset of images; and transforming at least one of the images in the set of images based on at least one of: the image transformation values, and the interpolated image transformation values. The method may further comprise transforming at least one of the images in the set of images based on both the image transformation values and the interpolated image transformation values.

In some embodiments of the method, transformation of all the images in the set enables the subject to appear more precisely centered at all angles of rotation relative to at least one of the rotational axis of the image set and an alternate predetermined rotational axis. In some embodiments of the method, selecting the subset of images comprises the steps of: i. identifying front and back images, wherein the front image is the image appearing closest and at the largest scale, the back image is the image appearing farthest and at the smallest scale, and wherein the front and back images are centered on the rotational axis relative to the angle at which the images were captured; ii. identifying left and right images, wherein the left image is the image appearing at the left most boundary of the subject rotation, the right image is the image appearing at the right most boundary of the subject rotation, and wherein the images appear to be at unity scale; and iii. designating the front, right, back and left images as being oriented at 0 degrees, 90 degrees, 180 degree, and −90 degrees respectively, relative to the angular rotation of the subject throughout the set of images.

In some embodiments the method further comprises at least one of scaling the front and back images to unity scale, shifting the left and right images to align them with at least one of the rotational axis and a predetermined alternate rotational axis, and shifting the front, back, right and left images as necessary to align them with a predetermined plane perpendicular to at least one of the rotational axis and the predetermined alternate rotational axis. In some embodiments, the method further determines offset values for at least one additional image in the image set, and determines interpolated offset values for at least one other additional image based on the at least one additional image as well. In some embodiments of the method, the image transformation values may include values for affecting at least one of shift, scale, rotation and tilt of individual images.

In some embodiments of the method, determining image transformation values for the subset of images comprises determining offset values indicating at least one of: a distance that a particular image from the subset of images is located relative to the rotational axis; a distance that a particular image from the subset of images is located relative to a predetermined plane perpendicular to the rotational axis; a larger or smaller scale that a particular image from the subset of images appears to be set at relative to unity scale; and a degree of tilt that a particular image from the subset of images appears to be indicating relative to the rotational axis. In some embodiments of the method, the step of transforming the images comprises at least one of shifting, scaling, rotating and tilting individual images within the set to reorient the images at or about a center defined by at least one of the rotational axis of the image set and an alternate predefined rotational axis.

In some embodiments of the method the image transformation values are optimized in a data fitting algorithm. In some embodiments of the method, the data fitting algorithm is a least squares algorithm. In some embodiments the method further comprises transforming the image set so that the subject appears to at least one of change scale, shift toward or away from a predefined rotational axis, shift along a plane passing through the predefined rotational axis, tilt, and rotate, throughout the image set.

In some embodiments of the method, in response to an image transformation value being modified, interpolation is automatically performed and transformation values are automatically applied to at least one of a portion of the images in the image set and the entire image set. In some embodiments, the method further comprises displaying a composite rendering of the subject at opposing and perpendicular rotational angles as well as any selected images or range of images. In some embodiments of the method, the subjects are rendered in translucent overlay.

In some embodiments of the method, the method for editing allows manipulation of two-dimensional properties comprising at least one of Cartesian x and y values, scale, rotation, and tilt. In some embodiments of the method, editing allows manipulation of three-dimensional properties associated with perspective projection comprising at least one of Cartesian x, y and z values, position and orientation of an imaging device, distance of subject to an image plane, and distance of camera to an image plane. In some embodiments, the method further comprises outputting at least one of two dimensional and three dimensional image transformation data.

In another exemplary embodiment, a method of editing a set of images depicting a subject at a plurality of rotational angles is disclosed, comprising at least one of sequential, non-sequential, and sequence independent steps comprising: selecting a set of images of a subject depicting the subject at a multitude of angular rotations about a first rotational axis; determining a first pair of images where the subject appears at the farthest distance from the first rotational axis and a second pair of images oriented approximately perpendicular to the first pair, wherein the subject in the second pair of images appears aligned most closely to a plane through the first rotational axis; determining offset values for these identified image pairs which, when corrected, result in causing the subject to appear centered on or about at least one of the first rotational axis and a second predetermined rotational axis; determining interpolated offset values for at least one other image in the set of images based upon the offset values of the first and second pairs of images; and transforming at least one of the images in the set of images based on at least one of: the image transformation values, and the interpolated image transformation values.

In some embodiments, the method further comprises determining offset values for at least one additional image in the image set, and determining interpolated offset values for at least one other additional image based on the at least one additional image as well. In some embodiments, the method further comprises the step of optimizing data of the offset values with a data fitting algorithm after interpolation.

In yet another exemplary embodiment, a computer system for editing a set of images depicting a subject displayed at a plurality of rotational angles is disclosed, comprising: means, by a computer, for defining degrees of angular rotation of the subject about a rotational axis; means, by the computer, for selecting a subset of images within the set of images based on the degrees of angular rotation of the subject depicted in the subset of images; means, by the computer, for determining image transformation values for the subset of images; means, by the computer, for determining interpolated image transformation values by interpolating the image transformation values for at least one of the images in the image set based on the image transformation values for the subset of images; and means, by the computer, for transforming at least one of the images in the set of images based on at least one of: the image transformation values, and the interpolated image transformation values.

In some embodiments of the system, the transforming means transforms the at least one of the images in the set of images based on both the image transformation values and the interpolated image transformation values. In some embodiments of the system, transformation of all the images in the set by the transforming means enables the subject to appear more precisely centered at all angles of rotation relative to at least one of the rotational axis of the image set and an alternate predetermined rotational axis.

In some embodiments of the system, selecting the subset of images by the selecting means comprises: i. identifying, by the selecting means, front and back images, wherein the front image is the image appearing closest and at the largest scale, the back image is the image appearing farthest and at the smallest scale, and wherein the front and back images are centered on the rotational axis relative to the angle at which the images were captured; ii. identifying, by the selecting means, left and right images, wherein the left image is the image appearing at the left most boundary of the subject rotation, the right image is the image appearing at the right most boundary of the subject rotation, and wherein the images appear to be at unity scale; and iii. designating, by the selecting means, the front, right, back and left images as being oriented at 0 degrees, 90 degrees, 180 degree, and −90 degrees respectively, relative to the angular rotation of the subject throughout the set of images. In some embodiments, the system further comprises a means, by the computer, for at least one of scaling the front and back images to unity scale, shifting the left and right images to align them with at least one of the rotational axis and a predetermined alternate rotational axis, and shifting the front, back, right and left images as necessary to align them with a predetermined plane perpendicular to at least one of the rotational axis and the predetermined alternate rotational axis.

In some embodiments, the system further comprises a means, by the computer, for determining offset values for at least one additional image in the image set, and determining interpolated offset values for at least one other additional image based on the at least one additional image as well. In some embodiments of the system, the image transformation values may include values for affecting, by the computer, at least one of shift, scale, rotation and tilt of individual images. In some embodiments of the system, determining, by the computer, image transformation values for the subset of images comprises determining offset values indicating at least one of: a distance that a particular image from the subset of images is located relative to the rotational axis; a distance that a particular image from the subset of images is located relative to a predetermined plane perpendicular to the rotational axis; a larger or smaller scale that a particular image from the subset of images appears to be set at relative to unity scale; and a degree of tilt that a particular image from the subset of images appears to be indicating relative to the rotational axis.

In some embodiments of the system, the means, by the computer, of transforming the images comprises means for at least one of shifting, scaling, rotating and tilting individual images within the set to reorient the images at or about a center defined by at least one of the rotational axis of the image set and an alternate predefined rotational axis. In some embodiments, the system further comprises means, by the computer, for optimizing the image transformation values using a data fitting algorithm.

In still yet another exemplary embodiment, computer system for editing a set of images depicting a subject at a plurality of rotational angles is disclosed, comprising: selecting means for selecting a set of images of a subject depicting the subject at a multitude of angular rotations about a first rotational axis; first determining means for determining a first pair of images where the subject appears at the farthest distance from the first rotational axis and a second pair of images oriented approximately perpendicular to the first pair, wherein the subject in the second pair of images appears aligned most closely to a plane through the first rotational axis; second determining means for determining offset values for these identified image pairs which, when corrected, result in causing the subject to appear centered on or about at least one of the first rotational axis and a second predetermined rotational axis; third determining means for determining interpolated offset values for at least one other image in the set of images based upon the offset values of the first and second pairs of images; and transforming means for transforming at least one of the images in the set of images based on at least one of: the image transformation values, and the interpolated image transformation values.

In some embodiments of the system, the second determining means can further determine offset values for at least one additional image in the image set, and determine interpolated offset values for at least one other additional image based on the at least one additional image as well. In some embodiments, the system further comprises optimizing means for optimizing data of the offset values with a data fitting algorithm after interpolation. In some embodiments, the system further comprises a means to apply a framed border of at least one of specified dimensions and color. In some embodiments of the system, the framed border may be applied to each image and transformed by the same values of x, y, scale, rotation, or tilt that are applied to the image.

In some embodiments, the system further comprises cropping means for cropping at least one image in the image set at specified dimensions. In some embodiments, the system further comprises a means for specify one or more sets of image output dimensions at least one of explicitly and as a maximum width and height. In some embodiments, the system further comprises a means to apply transform settings to one or more sets of images resulting in the output of images with the transformations applied. In some embodiments of the system, the set of images is contained as frames in a video file format; and the system further comprises means to automatically extract the frames from the video file for manipulation and output. In some embodiments, the system further comprising means for outputting edited images as a video file format.

BRIEF DESCRIPTION OF THE DRAWINGS

The foregoing summary, including the above and other features and advantages of the centering system and method, as well as a brief description of the preferred embodiments of the application will be better understood when read in conjunction with the appended drawings. For the purpose of illustrating the preferred embodiments of the present inventions, and to explain their operation, drawings of preferred embodiments and schematic illustrations are shown. It should be understood, however, that the application is not limited to the precise arrangements, variants, structures, features, embodiments, aspects, methods, advantages and instrumentalities shown, and the arrangements, variants, structures, features, embodiments, aspects, methods, advantages, improvements and instrumentalities shown and/or described may be used singularly in the system or method or may be used in combination with other arrangements, variants, structures, features, embodiments, aspects, methods, advantages, improvements and instrumentalities. In the drawings:

FIG. 4 illustratively depicts a flowchart progression of the tilt correction steps taken in accordance with some embodiments of the disclosed subject matter;

DETAILED DESCRIPTION OF THE INVENTION

Figure 1:
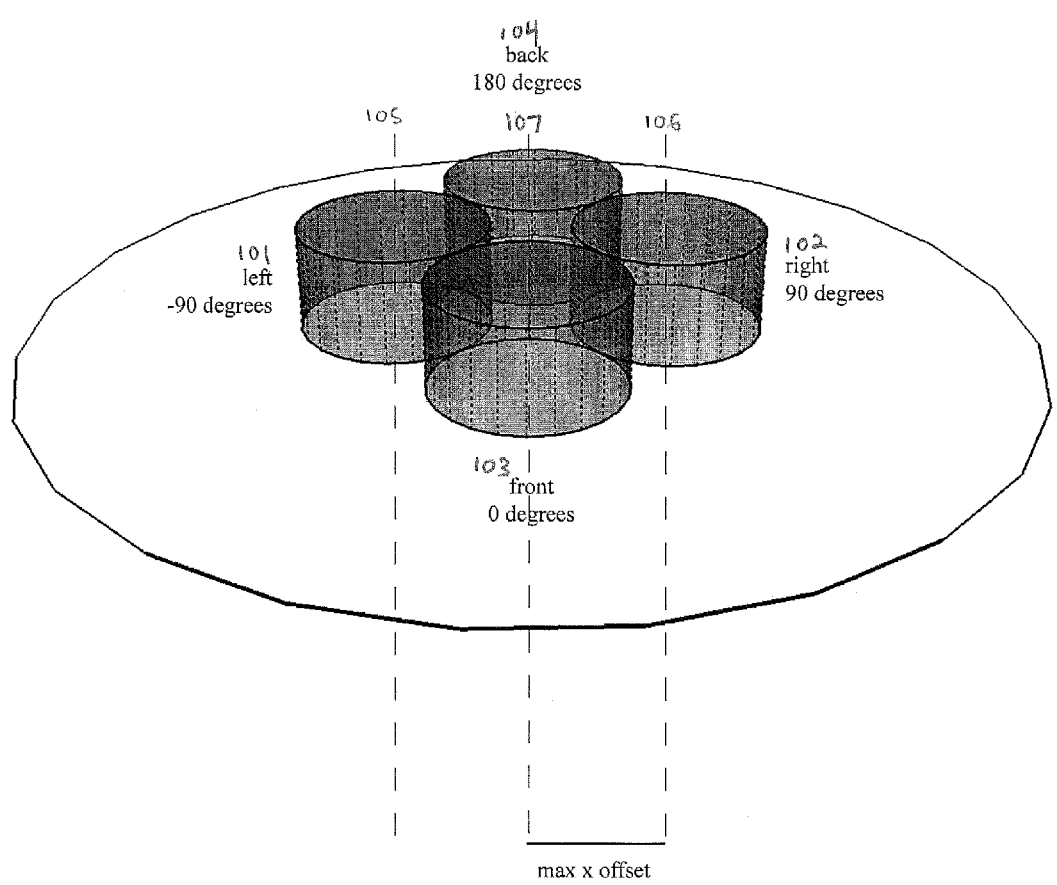
FIG. 1 illustratively depicts four images of an off-center subject on a rotating platform displayed together in "onion skin" mode in accordance with some embodiments of the disclosed subject matter.

Certain exemplary embodiments will now be described to provide an overall understanding of the principles of the structure, function, manufacture and use of the system and methods disclosed herein for centering images of an object captured while rotating about an axis. One or more examples of these embodiments are illustrated in the accompanying drawings and described herein. Those of ordinary skill in the art will understand that the systems, methods and examples described herein and illustrated in the accompanying drawings are non-limiting exemplary embodiments and that the scope of the present invention is defined solely by the claims. The features illustrated or described in connection with one exemplary embodiment may be combined with features of other embodiments and that the features may be used individually, singularly and/or in various combinations. Such modifications are intended to be included within the scope of the present invention.

The present invention provides a system and method for editing a set of images so that they appear to be more precisely centered on a rotational axis. The general stages or steps of the preferred embodiment are:

a.) rotational analysis of the subject;
b.) identification of a pair of images where the subject appears at the farthest distance from the rotational axis and a pair of perpendicular images where the subject appears aligned most closely to the rotational axis;
c.) determining offset values for these identified images that result in making the subject appear centered on the rotational axis;
d.) optionally determining offset values for other images in the image set;
e.) interpolating the data for the offset parameters based on subject rotational angle, and optionally optimizing the cumulative data with a data fitting algorithm such as least squares;
f.) optionally and/or alternatively, allowing additional sampling of images and use of a data fitting algorithm.
g.) optionally defining a "vertical alignment rotational offset" that corresponds to an image where the subject appears most vertically aligned, then adjusting image rotation and transform point for this image, its opposite, and the two perpendicular images, as well as any other images, and interpolating these parameters in a similar manner as previously described;
h.) optionally providing parameters to transform the image set so that the subject appears to move in a desired path in three-dimensional (3D) space;
i.) outputting two-dimensional (2D) image transformation data;
j.) outputting three-dimensional (3D) image description data;
k.) performing the two-dimensional (2D) image transformations; and
l.) performing the three dimensional (3D) image transformations.

Determining the angular rotation that the subject has undergone as displayed in a set of images may be accomplished in several ways. If an image row contains a full rotation of images, meaning the series of images shows the subject at a similar rotational angle after completing a full rotation, the user may use the number of images in this range as the number of images per 360 degree rotation, and conversely, the degree of subject rotation between each image.

If the image set does not include a full rotation, but does include at least a half rotation, it may be possible to identify two images at opposing positions and use the number of images in this range as the number of images per 180 degree rotation, which will also yield the number of images per 360 degree rotation.

If the image set does not include a full rotation, the subject may contain known properties, such as a right-angle edge that allows identification of two images at a known angle. The number of images per this known angular rotation may then be used to calculate the number of images per 360 degree rotation.

The degree of rotation (angular amount of rotation) between each image may also be provided as data from the image capturing system, or may be discerned by visible markings on the rotating platform that holds the subject.

If the rotational range of the image set is limited and known angles are inconclusive, the user may make an estimate of a given angular range and this value may be adjusted later.

If a full rotation image row is used, the preferred embodiment next identifies images of opposite rotational angles taken at a similar distance from the camera or imaging device. FIG. 1 illustratively depicts four images of an off-center subject on a rotating platform displayed together in "onion skin" mode in accordance with some embodiments of the disclosed invention. These images represent the subject at perpendicular angles where the left image 101 and the right image 102 appear to be at a similar scale and may be considered as placed along an x axis, as well as having a position of 0 along a z axis for the purposes of three-dimensional (3D) analysis. The front image 103 and back image 104 are closely aligned with the subject's rotational or y axis. The present invention allows the user to define the position of these images and adjust parameters in order to uniformly transform the images so that the subject appears more precisely centered about its rotational center or in another desired manner. As seen in FIG. 1, these images will typically appear with their centers farthest apart left to right. This pair of images (the left most image 101 and right most image 102) may be referred to as "identity profiles". Their centers (105, 106 respectively) may be considered to coincide with a horizontal x axis, and they may be considered to be at unity scale. When using two-dimensional (2D) or three-dimensional (3D) analysis, the vertical y axis 107, which, in some embodiments may be the subject rotational axis, will be located between their centers 105, 106. When using three-dimensional (3D) analysis, their position along a z axis that runs from the camera or imaging device through the rotational center of the subject may be considered to be 0. Because of these generalizations, identifying the identity profile (the left most image 101 and right most image 102) is helpful, though not essential, for transforming the image set.

It will be understood by those of ordinary skill in the art that while in some embodiments unity scale may refer to the scale of the identity profiles, unity scale may also be arbitrarily set to any desired unit of scale. For example, unity scale may represent a unit equivalent to the average scale of all the images in a set, or may be set to a specified unit such as one centimeter, one meter, one kilometer, etc.

It is notable that an "identity profile" or "front" and "back" images do not refer to an aesthetically aligned subject rotation, but rather to the subject's position relative to its rotational axis. In other words, when the subject is in front of its rotational axis and closest to the camera, it may not appear to be "facing" the camera.

It is also notable that just part of a subject may be deemed suitable as the focus of centering rather than the entire object. For example, given a flower planted in a round pot, it may be preferable for the pot to appear centered on the rotational axis rather than the entire plant. Such a part, for example the pot, would thus be considered in isolation for any alignments and calculations rather than the whole subject.

In one embodiment, the system offers visual tools to assist in finding identity profiles 101, 102, as well as a front image 103 or back image 104. These tools include "onion-skinning" opposing images, meaning the images are semi-transparent and superimposed, based on the number of images per rotation so that they may appear together. Thus, the dimensions of and the distance between the opposing subject images may be viewed and analyzed. The images of the subject at perpendicular angles (images rotated 90 degrees) may also be onion-skinned. As shown in FIG. 1, a subject may be seen at "perpendicular" angles, meaning at 90 degree intervals, and in "onion skin" mode. Such a visual tool can be useful for locating the front/rear (103, 104) images and left/right (101, 102) images, as well as observing these four images converge to center as parameters are adjusted. This may be helpful in identifying the front image 103 and back image 104, where the subject centers should appear aligned with the rotational axis.

One embodiment provides analysis tools to automatically retrieve the dimensions of each subject and calculate the distance between the opposing subjects. This may be done by determining and noting the bounds of a subject on a white or known background. The user may also select a specific region of the image frame to analyze, ignoring the rest. This tool may also automatically suggest a pair of opposing images of the subject with the greatest distance between them from side to side as a suggestion of subjects which may have had their images captured while at similar distances from the camera, but on opposing sides of the rotational axis (e.g., at 90 degrees and −90 degrees).

Once the identity profiles have been identified, their x offset from the rotational axis can be determined by adjusting this value until the centers of the identity profiles coincide. This point will also coincide with the rotational or y axis.

The preferred embodiment offers visual tools so that when the x offset value for the identity profiles is changed, the two subject images will visually change positions so that they may be centered on or moved closer to the rotational axis. However, it should be clear that this step is not required, and the system my simply calculate the x offset value based on projections of where the two subject images would have to be moved to, so that they may appear centered. (This is true for all other calculations involving offset calculations.) Once the two subject images are centered, the user may set ruler guides to mark the center area, as well as keep the onion skin images visible for reference.

After the identity profiles 101, 102, have been centered, the front and back profiles 103, 104, may be centered. The user may visually center the subject using either two-dimensional (2D) or three-dimensional (3D) parameters, or this may be done automatically by the system. The front and back profiles 103, 104, may be centered in the same manner as described above for the identity profiles but along the z axis as opposed to the x axis.

In one embodiment, the user may adjust two-dimensional (2D) parameters such as x and y positions, and scale in order to center the subject. For example, increasing the x value will move the image to the right, increasing the y value will move the image up, and increasing the scale (increasing the z value) will enlarge the image, thus changing the appearance of the subject's position and size.

In another embodiment, the user may adjust three-dimensional (3D) parameters such as x, z, and theta camera angle in order to center the subject. Three-dimensional (3D) parameter offsets may be transformed to two-dimensional (2D) parameter offsets using perspective projection and applied to the image set automatically.

Offset data for the other images (e.g., other than the identity profiles and front and back profiles) may be interpolated based on the angular rotation of the subject. An equation referring to the sine and cosine of the subject rotational angle may be used for interpolating (e.g., determining) the offset values for other images. If, for convention in FIG. 1, the front image 103 is said to be at angle 0, the back image 104 to be at angle 180, and the left profile 101 and right profile 102 to be at −90 and 90 degrees respectively, then interpolation of offset values for the remaining images throughout the image row may be based on the equation: $p'(alpha)=p(90)*sin(alpha)+p(0)*cos(alpha)$, where p' is the translated parameter value at subject rotational angle alpha, p(90) is the parameter offset value calculated at 90 degrees, and p(0) is the parameter offset value calculated at 0 degrees. This is a base form of the equation and multipliers and offsets may be added to it for input into a data fitting algorithm.

Looking again at FIG. 1, considering the left and right images, 101, 102, their respective distances (which are the same) from the center each represent the maximum x offset ("maxOffsetX") from the center. Given a front image defined at 0 degrees, the x offset ("offsetX") of each image correlates to the sine of the subject rotational angle ("angle"):

$$\text{offsetX}(\text{angle}) = \sin(\text{angle}) * \text{maxOffsetX}$$

Based on the convention in FIG. 1, the right image 102 will have an x offset of $\sin(90)*\text{maxOffsetX}=1*\text{maxOffsetX}=\text{maxOffsetX}$. Thus, the right image 102 will have an x offset equal to the maximum x offset. Similarly, based on the convention, the left image 101 will have an x offset of $\sin(-90)*\text{maxOffsetX}=-1*\text{maxOffsetX}=-\text{maxOffsetX}$. It will thus be translated to the center by the same amount as the right image 102, but in the opposite direction. The front image 103 will have an x offset of $\sin(0)*\text{maxOffsetX}=0*\text{maxOffsetX}=0$. Thus the front image 103 will have an x offset of 0 and will not be translated. This is also true for the back image 104.

The front and back images 103, 104, represent the maximum scale offset ("maxScale") in that the front image 103 will appear at a larger scale than the left and right images 101, 102, and the back image 104 will appear at a smaller scale than the left and right images 101, 102. Given a front image 103 defined at 0 degrees, this scale offset ("offsetScale") correlates to the cosine of the subject rotational angle:

$$\text{offsetScale(angle)} = \text{maxScale} * \cos(\text{angle})$$

The front image 103 will have a scale offset of cos(0) *maxScale=1*maxScale=maxScale. Thus, the front image 103 will have a scale offset equal to the maximum scale offset. Conversely, the back image 104 will have to be scaled by the same maxScale, but it will have to be scaled up, rather than scaled down.

The right image 102 will have a scale offset of cos(90) *maxScale=0*maxScale=0. Thus, the right image 102 will have a scale offset of 0 as it is by definition at unity scale, as is the left image 101, being equidistant from the camera or imaging device that captured the image.

In a similar manner, a maximum y offset "maxOffsetY" may be determined by aligning front and back images 103, 104, and it will correlate with the cosine of the subject rotational angle:

$$\text{offsetY(angle)} = \text{maxOffsetY} * \cos(\text{angle})$$

To summarize these algorithms where "angle" is the subject rotational angle:

$$\text{offsetX(angle)} = \text{maxOffsetX} * \sin(\text{angle})$$

$$\text{offsetScale(angle)} = \text{maxScale} * \cos(\text{angle})$$

$$\text{offsetY(angle)} = \text{maxOffsetY} * \cos(\text{angle})$$

Figures 2A, 2B, 2C, 2D, 2E:
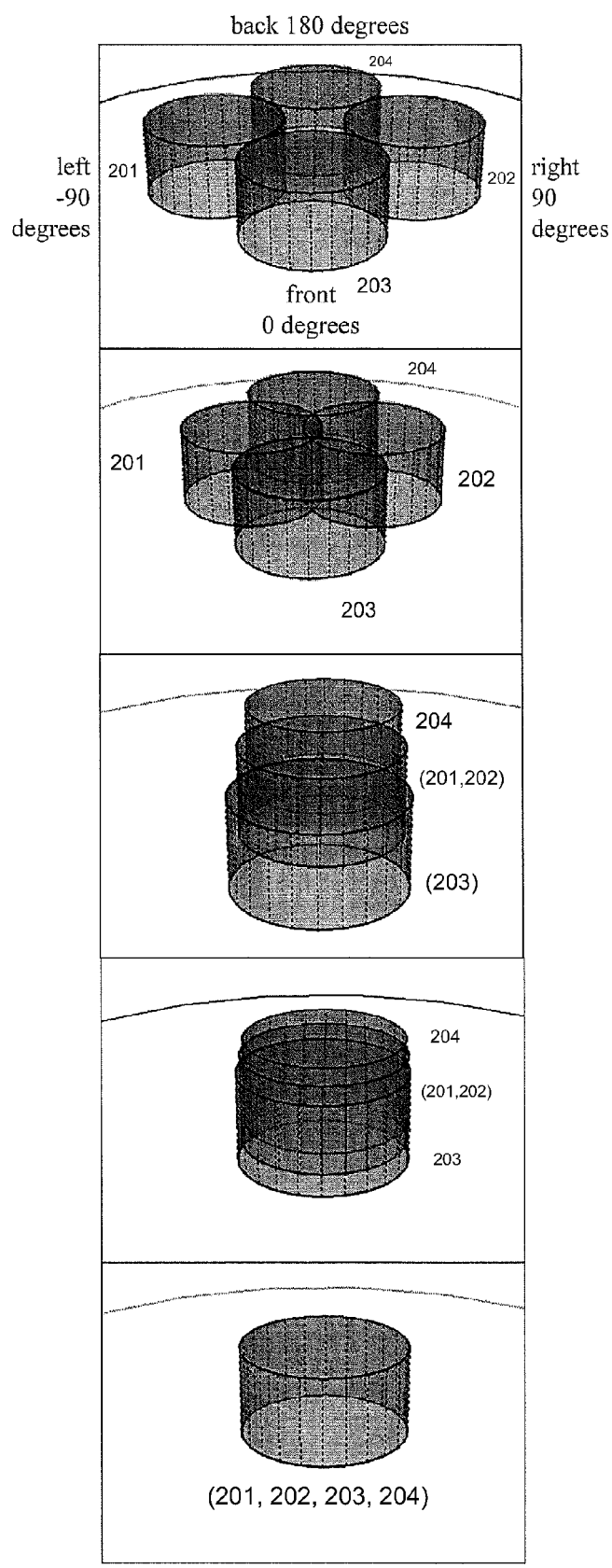
FIGS. 2a-e illustratively depict a visual progression of the steps taken in accordance with some embodiments of the disclosed subject matter.

An exemplary visual progression of the steps taken in the above calculations is shown in FIGS. 2a-e. FIG. 2a shows the left 201, right 202, front 203, and back 204, images being identified. The left and right images 201, 202, are at unity scale, while the front and back images 203, 204, are centered on the subject rotational axis, but are scaled up and down respectively, relative to unity scale.

In FIG. 2b-c, the maximum x offset is determined by moving the left and right images 201, 202, toward the center and aligning them with the subject rotational axis as well and calculating the distance moved in order to align the rotational axis (the center or predefined axis) of the two images. In FIG. 2b the left and right images 201, 202, are shown closer to the center, and in FIG. 2c the left and right images 201, 202, are centered on the rotational axis. Next, as shown in FIG. 2d, the maximum scale offset is determined by moving the front and back images 203, 204, toward the unity scale, aligning the front and back images 203, 204, with the left and right images 201, 202, (now merged in the center) at the same scale and determining the distance moved in order to align the rotational axis (center or predefined axis) of the two images. For elevated or descended camera angles, additionally determining maximum y offset by aligning front and back images 203, 204, to center and determining the distance of movement may be necessary as well.

Finally, as shown in FIG. 2e, the result of the offset shift and scaling is a single centered image (left 201, right 202, front 203, and back 204, all aligned to the center). These offset amounts are maximum scale offset, maximum x offset, and maximum y offset, if necessary. All the other images in the image set can then be interpolated based on the rotational angle of each image by using, for example, equations offsetX (angle)=maxOffsetX*sin(angle), offsetScale(angle) =maxScale*cos(angle), and offsetY(angle) =maxOffsetY*cos(angle), as described above.

The user can also center other images besides the identity profiles and front and back images, and the cumulative offset data that is gathered can be used with an equation like the ones previously described as input to a data fitting algorithm such as a "least squares" algorithm.

Adjustments made in two dimensions (2D) may yield data offsets such as x offsets, y offsets, and scale offsets. The parameters x, y, and scale are two-dimensional (2D), yet it is also possible to use three-dimensional (3D) parameters. For example, if using a graphical user interface that supported three-dimensional (3D) perspective, the user could align the front and back images using a z-axis parameter. This parameter value could be interpolated to other images as correlated to the cosine of the subject rotational angle.

If the adjustments have been done in three dimensions (3D) using parameters such as x, z, and camera angle, these parameters may similarly be input to a data fitting algorithm and the resulting offsets translated into two dimensions (2D) using the principles of perspective projection. For example, a three-dimensional (3D) vector of x, y, z may be translated to a two-dimensional (2D) vector of x, y and a value for scale percentage derived from the value of z. Cumulative data for three-dimensional (3D) offsets may similarly be input into a data fitting algorithm based on the subject's rotational angle.

Alternatively, if the adjustments have been done in three dimensions (3D) then the resulting two-dimensional (2D) parameter offsets may be used as input to a data fitting algorithm.

When performing three-dimensional (3D) calculations, it can be assumed that the z offset of the front and back images equals the x range offset of the identity profiles. That is to say, the z distance of the front and back images from the rotational axis equals the x distance of the identity profiles from the rotational axis. This generalization may allow the user to adjust a single three-dimensional (3D) axis offset parameter or to "link" x and z offset values in order to center the images. If alignment is unsatisfactory, further precision may be achieved by adjusting other three-dimensional (3D) parameters and offsets as will be described.

Camera angle may be provided as data from the image capturing system, or it can be adjusted manually such that all subjects in an image row appear aligned, which may be accomplished by viewing an image row in onion skin mode. Other three-dimensional (3D) parameters may be adjusted as desired. Some embodiments allow altering parameters such as the ratio of the subject's distance to the focal plane relative to the focal point's distance to the image plane.

The preferred embodiment offers immediate visual feedback as parameters are changed. This is subject to a set of minimum requirements that includes the subject rotational angles being defined. In this system, any change to an image parameter will result in a recalculation of offsets for the entire image set, which will be applied and preferably viewable immediately.

Default values for the front, back, and identity profile images may be set based on the number of images in the image row being changed. The user may then redefine these as described previously.

The preferred embodiment includes the ability to offset the subject rotational value per image so that more accurate calculations may be made. It also includes the ability to offset the angle of the front image to an angle near 0 instead of exactly 0. These offsets may allow more accurate calculations to be made, for example, in cases where the closest image to the rotational axis is not in exact alignment with it, or in cases where the two closest images a full rotation apart do not satisfactorily appear to match.

When these offsets are used, values for the perpendicular angles of 0, 90, 180, and −90 can be calculated and/or interpolated and/or defined and stored, for example in a computer memory, for use in the image set calculations.

Changing one of these angle offset values in the preferred embodiment would again result in a recalculation of parameter offsets for the entire image set, which will be applied and preferably viewable immediately. Variables for offset values may be incorporated into the equation that is used for interpolation and input into the data fitting algorithm. This may be particularly useful in cases where the identity profiles cannot be accurately determined because the image set shows a limited range of rotation by the subject.

Defining the front angle as 0 is arbitrary and other implementations are possible.

Figure 3:
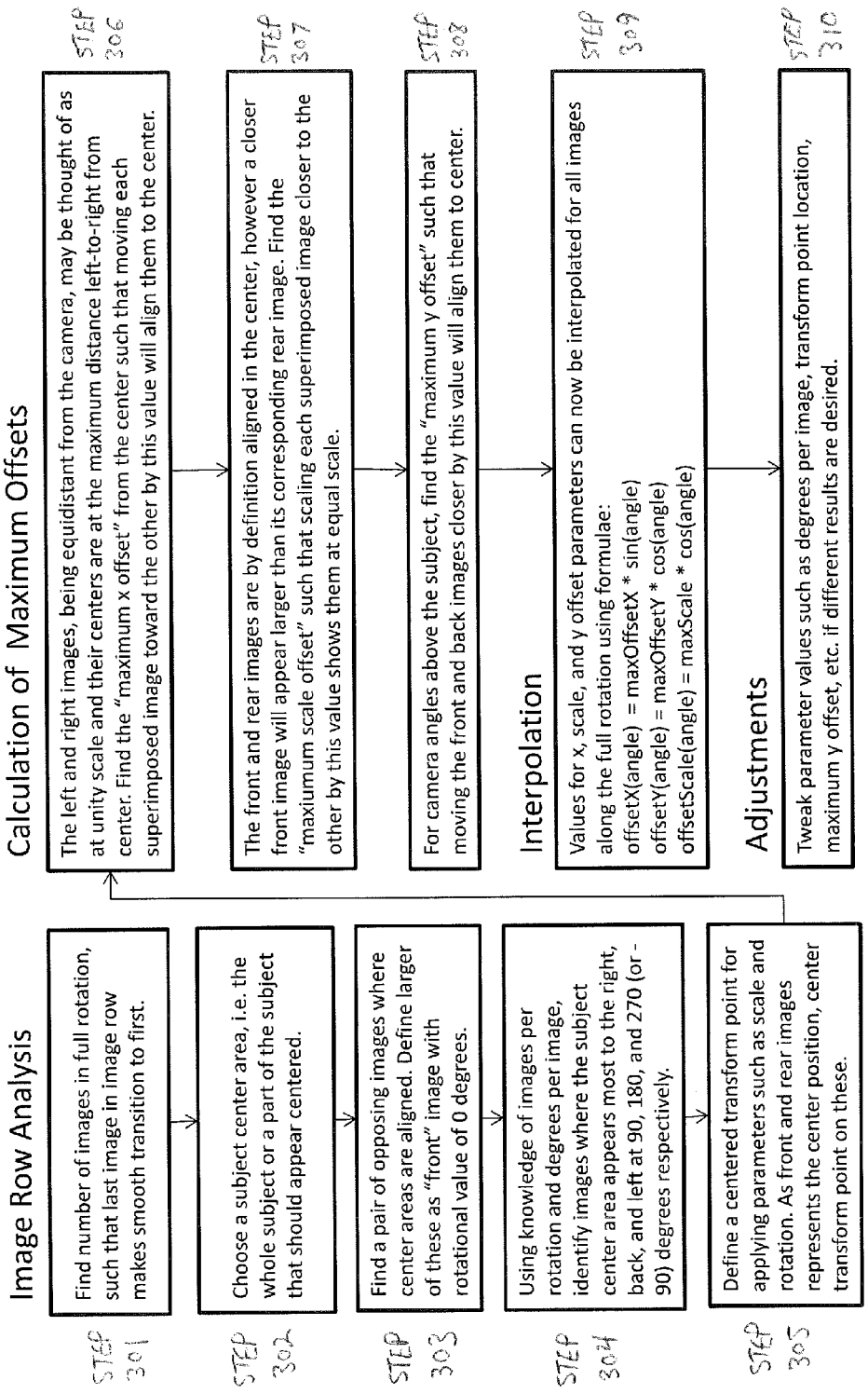
FIG. 3 illustratively depicts a flowchart progression of the steps taken in accordance with some embodiments of the disclosed subject matter.

An exemplary embodiment of the methods described herein is outlined in the flowchart depicted in FIG. 3, particularly outlining exemplary procedures for sub-programs, routines and methods referred to as Image Row Analysis, Calculation of Maximum Offsets, Interpolation, and Adjustments. The Image Row Analysis stage begins at step 301, where a user selects a number of images in an image row displaying a full rotation, such that the last image in the image row makes a smooth transition to the first. At step 302, the user selects a subject center area, i.e. the whole subject or a part of the subject that should appear centered (or centered about a rotational axis) in the final product. At step 303, the user finds and selects a pair of opposing images whose center areas are aligned. The larger of these is defined as the "front" image, with a rotational value of 0 degrees.

Next, at step 304, the user, using knowledge of the number of images captured per complete or partial rotation of the subject (images per rotation), and the number of degrees between images (degrees per image), identifies images where the subject center area appears the greatest amount to the right, back, and left at 90, 180, and 270 (or −90) degrees respectively. Then, at step 305, the user defines a centered transform point or position, which is the point or axis about which the user wants to manipulate and transform the image, and which, in some embodiments is at or about the rotational axis, but may also be located at another predefined position as desired. Parameters such as scale and rotation will be applied to selected images as necessary to transform them to the desired position. Since front and rear images represent the center position along the x-axis, as they align with a plane passing through the rotational axis, the user may center the transform position in line with these images. In some exemplary embodiments, the Image Row Analysis stage may be useful for determining which images within a set of images depicting a subject rotating about a rotational axis may optimally be used as reference images for calculating offsets of other images. This is because it is presumably less difficult to calculate the maximum offsets of these reference images (as will be explained below) than other images throughout the rotational axis, and then to interpolate the data of these references to the other images.

The Calculation of Maximum Offsets stage begins at step 306. The left and right images, being equidistant from the camera, may be thought of as at unity scale and their centers are at the maximum distance left-to-right from center (see FIG. 1). The user may find the "maximum x offset" from the center such that moving each superimposed image toward the other by this value will align them at the center. As indicated in step 307, the front and rear images are by definition aligned in the center, however a closer front image will appear larger than its corresponding rear image. Therefore, the user then finds the "maximum scale offset" such that scaling each superimposed image by this value shows them at equal scale or at least closer in size to each other. While the front image is scaled down to unity scale, the back image is scaled up. At step 308, for camera angles above (or below) the subject, the user may find the "maximum y offset" such that moving the front and back images closer by this value will align them up and down (vertically) so that they are centered, or at least closer to the center.

As indicated at step 309, once the relevant maximum offsets have been calculated, the Interpolation stage commences, where values for x offset, scale offset, and y offset parameters may now be interpolated for all images along the full angular rotation using formulae:

$$\text{offset}X(\text{angle}) = \text{maxOffset}X * \sin(\text{angle})$$

$$\text{offset}Y(\text{angle}) = \text{maxOffset}Y * \cos(\text{angle})$$

$$\text{offsetScale}(\text{angle}) = \text{maxScale} * \cos(\text{angle})$$

Finally, once all offset values of the remaining images have been interpolated, the exemplary method concludes with the Adjustment stage at step 310, where the images are transformed, manipulated and/or moved. The user may tweak parameter values such as degrees of angular rotation to be rotated per image, transform point location, maximum y offset, etc., if different results are desired.

If the vertical alignment of a subject to the rotational axis is unsatisfactory, the preferred embodiment allows a means to rotate the images in the image set so that the subject appears vertical throughout.

In another exemplary embodiment, if the image set includes a full subject rotation or if it is otherwise possible to determine the subject's greatest degree of tilt to the left and to the right, these values are noted and stored. If these values are not equal, it indicates the subject's rotational axis is misaligned with the camera. In this case, the average of these angles is used as an offset to rotate the entire image set equally so that the subject's leftmost tilt and rightmost tilt appear equal. Preferably this should be done before any other transformations.

If the subject's rotational axis is satisfactorily vertical, the image is located where the subject appears most vertical (the highest) and the subject rotational angle in this image is used as a "vertical alignment rotational offset". This is used because the perceived range of tilt of the subject is not likely to coincide with its perceived range of travel along the x axis as previously described in determining the identity profiles. In other words, it is not likely that the subject will appear most vertical in one of the identity profiles or in the front or back image.

The user may then locate the images at perpendicular subject rotational angles to this vertical image, which show the greatest degree of tilt, and rotate them as desired by defining a rotational transform point and a degree of rotation. As the image set may already be subject to scaling, the x and y values of the rotation transform point may be represented as percentages of the image's width and height respectively.

An exemplary embodiment of the tilt correction methods described herein is outlined in the flowchart depicted in FIG. 4, which outlines exemplary procedures for Tilt Analysis, Calculation of Maximum Rotational Offsets, Interpolation, and Adjustments. The Tilt Analysis stage begins at step 401, where a user sets a transform point for image rotation, which is a point that corresponds to the perceived point around which the subject is rotated (tilted) in a plane through the rotational axis of the subject. For example, if the subject is a cylinder and the center of its base has been centered at the rotational axis of the cylinder, the user may choose a point in the middle of the base as a rotation (tilt) transform point, about which the cylinder is currently tilted.

In this and other embodiments, tilt can be understood, for example, as an offset of one end of a subject from a defined axis, while a second end of the subject is located on the defined axis. In this light, tilt can be corrected, for example, by rotating the first end of the subject about a point on the second end of the subject along a plane through the defined axis, until the first end is also located on the axis. Alternatively, the first and second ends of the subject may both be located off the defined axis (in the plane through the defined axis), but one end may be farther away from the defined axis than the other end. In this case, tilt can be corrected, for example, by rotating the entire subject along the plane through the defined axis, and about a point on the axis, until both ends of the subject are located on the defined axis. At step 402, the user next determines the image where the subject is perceived to be least tilted, as it is leaning either directly towards or away from the direction in which the image was captured, thus partially obscuring the degree of tilt of the subject. The user may define this subject rotational angle as the "vertical alignment rotational offset," which is the number of degrees from the "front" image defined as 0 degrees.

The Calculation of Maximum Rotational Offsets stage begins at step 403. The images at subject rotational angles 90 degrees in either direction (to the left or right) from this image will appear most tilted. The user may use one or both of these images to determine the "maximum rotational offset" such that tilting the images toward a vertical position by this value will make them appear vertical by correcting the tilt.

Once the relevant maximum rotational offsets have been calculated, the Interpolation stage commences, where in step 404 values for rotational offset parameters may now be interpolated for all images using the formula:

rotationalOffset(subjectRotationalAngle−verticalAlignmentRotationalOffset)
=maxRotationalOffset*sin(subjectRotationalAngle−verticalAlignmentRotationalOffset)

Once all the offset values of all the remaining images have been interpolated, the exemplary method concludes with the Adjustment stage, where at step 405 the user may tweak parameter values such as vertical alignment rotational offset, transform point location, etc., if different results are desired.

The preferred embodiment allows the user to select a region of known rotational symmetry, for example a vertical cylinder or cube, in order for the system to analyze the edges over a white or known background, and then automatically perform one or more of the functions described previously, such as calculating the range of tilt, offsetting the entire image set so that the rotational axis is vertical, locating an image where the subject appears most vertical, and defining a vertical alignment rotation offset.

Figure 5A:
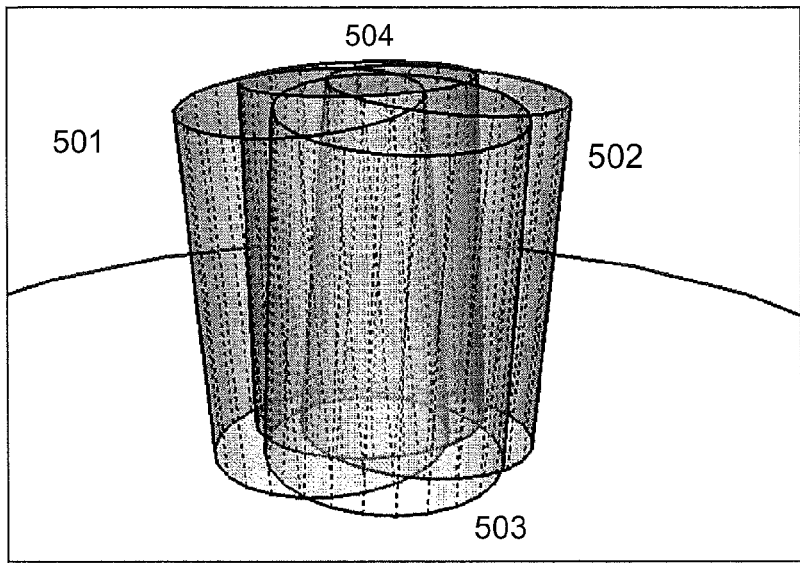
FIGS. 5a-c illustratively depict a visual progression of the tilt correction steps taken in accordance with some embodiments of the disclosed subject matter.

An exemplary visual progression of the steps taken in an exemplary embodiment described above is shown in FIGS. 5*a-c*. FIG. 5*a* shows a cylindrically shaped subject which is uncentered and displaying a tilt, both of which are to be corrected. Using Onion Skin mode, left 501, right 502, front 503, and back 504 positions relative to the subject's rotational axis are identified and illustrated in FIG. 5*a*.

Figure 5B:
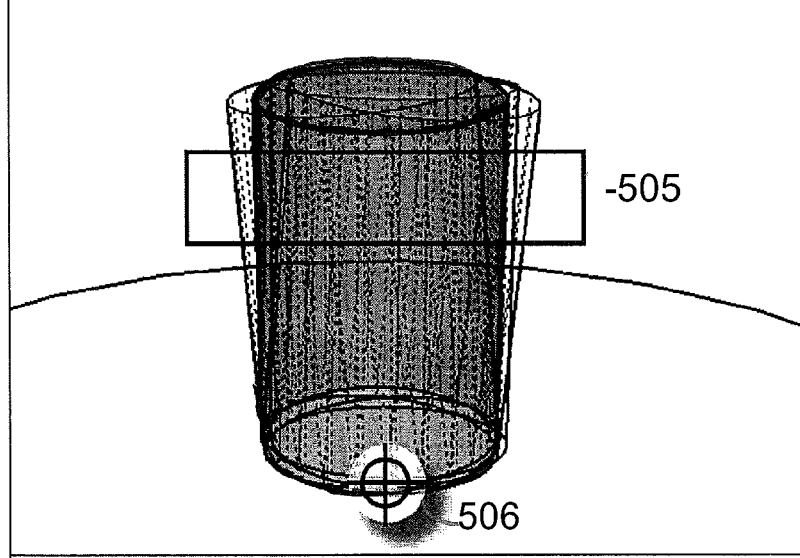
Figure 5C:
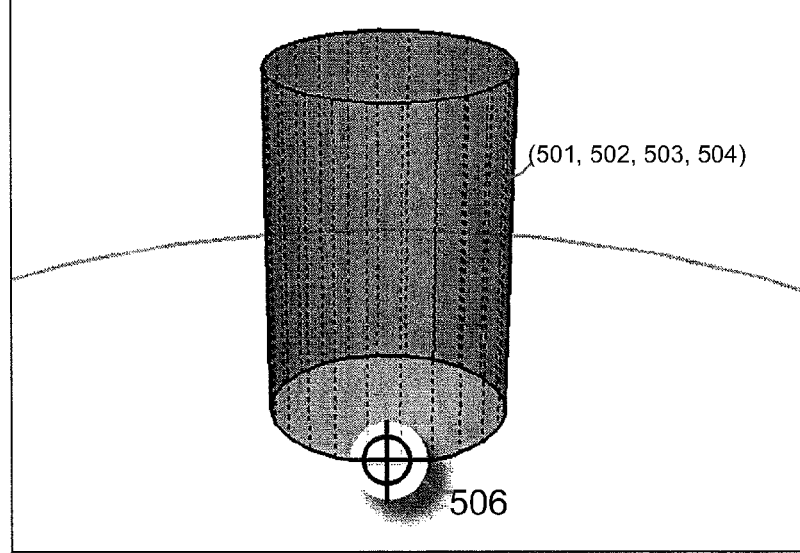

In the step of FIG. 5*b*, the subject is first centered at its base using, for example, the method described in FIGS. 2*a-e* (determining maximum x offset values of identity profiles and determining interpolated offset values based thereon, etc.) The shaded subject represents the angle of subject rotation where perceived tilt is at minimum due to the subject leaning toward the camera or imaging device. The images of the subject at 90 degrees in either direction show the most tilt, which is used to define the maximum tilt offset. The rectangular marker 505 represents an area of known vertical symmetry, which the user may select to assist in the computer analysis for identifying these positions. Rotation of the subject will be performed about the transform point 506 indicated at the base of the subject along a vertical plane through the transform point 506, to correct the tilt of the subject. This can be performed, for example, using the method described in the flowchart of FIG. 4. Finally, FIG. 5C shows the cylindrically shaped subject with tilt (and centering) corrected.

In a manner similar to the previous transformations, rotation about the transform point indicated at the base of the subject along a vertical plane through the transform point to correct the tilt of the subject can be applied to the images in the image row and the cumulative data of transform points and rotation amounts can be used in a data fitting algorithm based on the subject rotational angle that is offset by the vertical alignment rotation offset.

Figure 6A:
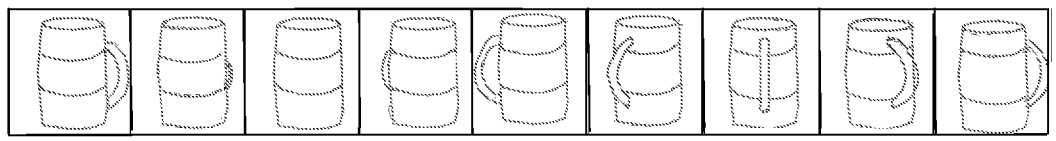
FIGS. 6a-b illustratively depict a sample image rows in accordance with some embodiments of the disclosed subject matter.
Figure 6B:
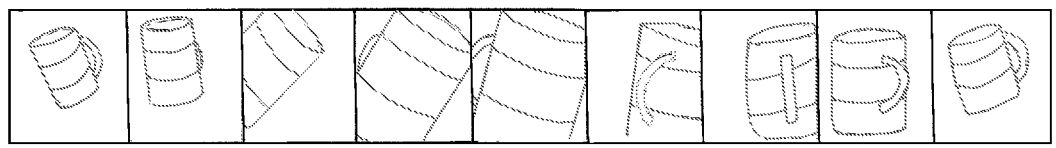

One exemplary embodiment allows further creative manipulation of the subject around the rotational axis. For example, following computations to satisfactorily center the subject, a data set may be transformed to show the image zooming in from a distance and around the rotational axis at a distance. An example of such creative alignment and zooming can be seen in FIGS. 6*a-b*. FIG. 6*a* shows an exemplary image row where the subject has been properly centered and calibrated. FIG. 6*b* shows an image row wherein the data set has been transformed based on input from a user in order to show the image zooming in from a distance, around the rotational axis at a distance, as well as tilting. One of ordinary skill in the art would understand that this is simply an example of the kind of creativity afforded by the present invention, and that many different effects may be created by modifying the data set with different combinations of adjustments.

The preferred embodiment provides a means to specify a border frame of a specific color and to display this frame with the same transformations as the image being displayed. This allows extraneous elements at the edges of an image to be hidden and a seamless background to be shown by masking around the subject area. For example, if an image contains a subject on a pure white background and some photography set materials are visible on the image periphery, it would be desirable to mask these materials with a pure white background border. If the images in an image set undergo transformations such as translation, scale, and/or rotation, the mask should preferably undergo the same transformations to continue masking correctly.

The preferred embodiment also provides a means to crop the image set as desired.

The preferred embodiment also provides a means to specify one or more sets of image output dimensions. These dimensions may be defined explicitly in terms of pixels or other numeric measurement, or scaled so that the cropped area fits within a specified maximum width and height.

While the preferred embodiment displays the transformed image set in real time, it may display lower-resolution images for performance purposes. Once the subject is satisfactorily centered, the system may output two-dimensional (2D) image transformation data that can be applied to high-resolution images, including border, crop, and output dimensions data. In addition, the system may output any three-dimensional (3D) description data that was computed. The system may process these high-resolution images to make resulting image files with the transformations applied, including border, crop, and output dimensions transformations. More than one set of images may be output. For example, the same image set may be output with two different output dimensions.

To center a subject represented by multiple image rows, i.e., rotations captured at different longitudinal angles, guides or onion skin images from one satisfactorily centered image row may be used as a target for transforming subsequent image rows. Other image rows may be centered and offset to match this target. This may be accomplished, for example, by a process that aligns the rows to one another by translating all the images of one row by the same amount so that the chosen center points for each image row are aligned.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is described and illustrated, and may be incorporated into a computer, computer system or other computing device as a sequence of steps to be performed that lead to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices, such as, for example, machines comprising central processing units and/or microprocessors.

The present invention also relates to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, a specially programmed special purpose computer, or may be integrated into any other suitable device. The user may interact with the system via e.g., a personal computer, smartphone, tablet, imaging device (such as a digital camera or video recording device) or over PDA, e.g., the Internet, an Intranet, etc. Any of these, or their equivalents, may be implemented as a distributed computer system rather than a single computer.

Figure 7:
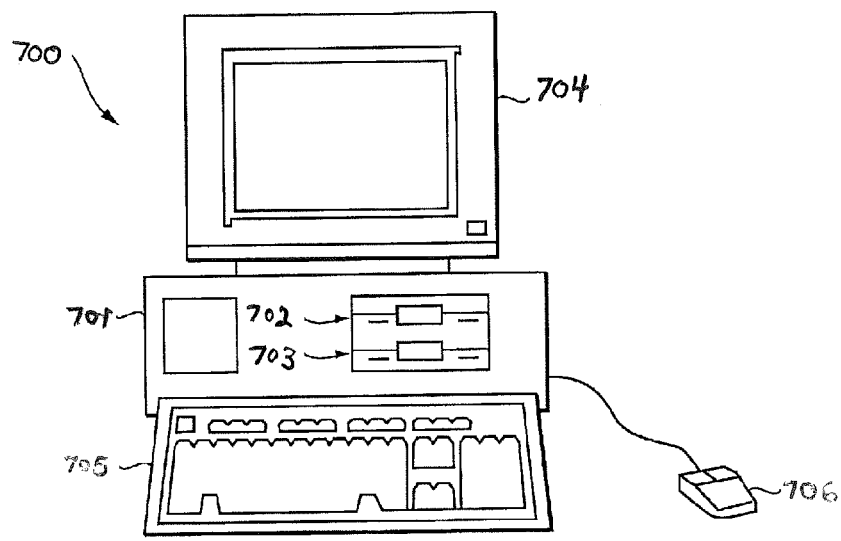
FIG. 7 illustratively depicts an exemplary diagram of computer system utilizable for employing the methods and systems of the present invention in accordance with some embodiments of the disclosed subject matter.

The processes and procedures of the present invention may be implemented in any computer system or computer-based controller or device. One example of such a system is described in greater detail below with reference to FIG. 7. More specifically, FIG. 7 is an illustration of a computer 700 used for implementing the computer processing in accordance with a computer-implemented embodiment of the present invention. The procedures described above may be presented in terms of program procedures executed on, for example, a computer or network of computers, including local and/or global area networks such as the Internet.

Viewed externally in FIG. 7, computer 700 has a central processing unit (CPU) 701 having disk drives 702, 703. Disk drives 702, 703 are merely symbolic of a number of disk drives that might be accommodated by computer 700, internally or externally attached. Typically, these might be one or more of the following: a removable disk drive 702, a hard disk drive (not shown), and a CD ROM or digital video disk, optical disk memory, solid-state drive (SSD), memory card, thumb drive, etc., as indicated by the slot at 703. The number and type of drives varies, typically with different computer and/or device configurations. Disk drives 702, 703 are, in fact, options, and for space considerations, may be omitted from the computer system used in conjunction with the processes described herein.

Computer 700 also has a display 704 upon which information may be displayed. The display is optional for the computer used in conjunction with the system described herein. A keyboard 705 and/or a pointing device 706, such as a mouse 706, may be provided as input devices to interface with central processing unit 701. To increase input efficiency, keyboard 705 may be supplemented or replaced with a scanner, card reader, or other data input device. The pointing device 706 may be a mouse, touch pad control device, track ball device, touch screen, or any other type of pointing device.

Figure 8:
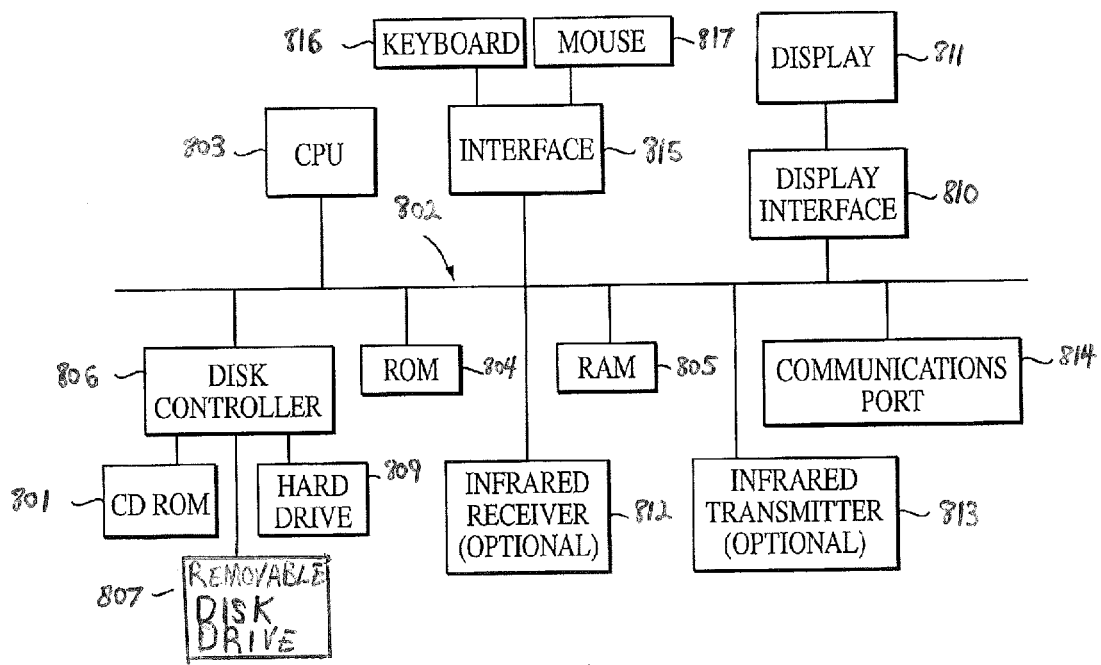
FIG. 8 illustratively depicts an exemplary block diagram of the internal hardware of the computer system of FIG. 7 in accordance with some embodiments of the disclosed subject matter.

Alternatively or additionally, referring to FIG. 8, computer 700 may also include a CD ROM reader and writer 801, which are interconnected by a bus 802 along with other peripheral devices supported by the bus structure and protocol. Bus 802 serves as the main information highway interconnecting other components of the computer.

FIG. 8 illustrates a block diagram of the internal hardware of the computer of FIG. 7. CPU 803 is the central processing unit of the system, performing calculations and logic operations required to execute a program. Read only memory (ROM) 804 and random access memory (RAM) 805 constitute the main memory of the computer. Disk controller 806 interfaces one or more disk drives to the system bus 802. These disk drives may be removable disk drives such as 807, or CD ROM or DVD (digital video/versatile disk) drives, as at 808, or internal or external hard drives 809. As previously indicated these various disk drives and disk controllers are optional devices.

A display interface 810 permits information from bus 802 to be displayed on the display 811. Again, as indicated, the display 811 is an optional accessory for a central or remote computer in the communication network, as are infrared receiver 812 and transmitter 813. Communication with external devices occurs using communications port 814.

In addition to the standard components of the computer, the computer may also include an interface 815, which allows for data input through the keyboard 816 or pointing device, such as a mouse 817, or a touch-screen.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims. As another example, the system according to the invention may include a general purpose computer, or a specially programmed special purpose computer. The user may interact with the system via e.g., a personal computer or over PDA, e.g., the Internet or Intranet, etc. Either of these may be implemented as a distributed computer system rather than a single computer. Moreover, the processing could be controlled by a software program on one or more computer systems or processors, or could even be partially or wholly implemented in hardware, such as a digital imaging device or other hand-held device.

Although the computer system 700 in FIG. 7 is illustrated as having a single computer, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on removable disk, provided on CD ROM, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

The many features and advantages of the embodiments of the present invention are apparent from the detail specification, and thus, it is intended by the appended claims to cover all such features and advantages of the invention that fall within the true spirit and scope of the invention. Further, since numerous modifications and variations were readily occurred to those skilled in the art, it is not desired to limit the invention to the exact construction and operation illustrated and described, and accordingly, all suitable modifications and equivalents may be resorted to, falling within the scope of the invention.

What is claimed is:

1. A method of editing a set of images depicting a subject displayed at a plurality of rotational angles comprising at least one of sequential, non-sequential, and sequence independent steps, the method comprising causing a processing device to perform steps comprising:
    defining degrees of angular rotation of the subject about a rotational axis;
    selecting a subset of images within the set of images based on the degrees of angular rotation of the subject depicted in the subset of images;
    determining image transformation values for the subset of images;
    determining interpolated image transformation values by interpolating the image transformation values for at least one of the images in the image set based on the image transformation values for the subset of images; and
    transforming at least one of the images in the set of images based on at least one of: the image transformation values, and the interpolated image transformation values.

2. The method of claim 1, further comprising transforming at least one of the images in the set of images based on both the image transformation values and the interpolated image transformation values.

3. The method of claim 1, wherein transformation of all the images in the set enables the subject to appear more precisely centered at all angles of rotation relative to at least one of the rotational axis of the image set and an alternate predetermined rotational axis.

4. The method of claim 1, wherein selecting the subset of images comprises the steps of:
    i. identifying front and back images, wherein the front image is the image appearing closest and at the largest scale, the back image is the image appearing farthest and at the smallest scale, and wherein the front and back images are centered on the rotational axis relative to the angle at which the images were captured;
    ii. identifying left and right images, wherein the left image is the image appearing at the left most boundary of the subject rotation, the right image is the image appearing at the right most boundary of the subject rotation, and wherein the images appear to be at unity scale; and
    iii. designating the front, right, back and left images as being oriented at 0 degrees, 90 degrees, 180 degree, and −90 degrees respectively, relative to the angular rotation of the subject throughout the set of images.

5. The method of claim 4, further comprising at least one of scaling the front and back images to unity scale, shifting the left and right images to align them with at least one of the rotational axis and a predetermined alternate rotational axis, and shifting the front, back, right and left images as necessary to align them with a predetermined plane perpendicular to at least one of the rotational axis and the predetermined alternate rotational axis.

6. The method of claim 1, further determining offset values for at least one additional image in the image set, and determining interpolated offset values for at least one other additional image based on the at least one additional image as well.

7. The method of claim 1, wherein the image transformation values may include values for affecting at least one of shift, scale, rotation and tilt of individual images.

8. The method of claim 1, wherein determining image transformation values for the subset of images comprises determining offset values indicating at least one of:
    a distance that a particular image from the subset of images is located relative to the rotational axis;
    a distance that a particular image from the subset of images is located relative to a predetermined plane perpendicular to the rotational axis;
    a larger or smaller scale that a particular image from the subset of images appears to be set at relative to unity scale; and
    a degree of tilt that a particular image from the subset of images appears to be indicating relative to the rotational axis.

9. The method of claim 1, wherein the image transformation values are optimized in a data fitting algorithm.

10. The method of claim 9, wherein the data fitting algorithm is a least squares algorithm.

11. The method of claim 1, further comprising transforming the image set so that the subject appears to at least one of change scale, shift toward or away from a predefined rotational axis, shift along a plane passing through the predefined rotational axis, tilt, and rotate, throughout the image set.

12. The method of claim 1, wherein, in response to an image transformation value being modified, interpolation is automatically performed and transformation values are automatically applied to at least one of a portion of the images in the image set and the entire image set.

13. The method of claim 1, further comprising displaying a composite rendering of the subject at opposing and perpendicular rotational angles as well as any selected images or range of images.

14. The method of claim 13, wherein the subjects are rendered in translucent overlay.

15. A method of editing a set of images depicting a subject at a plurality of rotational angles comprising at least one of sequential, non-sequential, and sequence independent steps, the method comprising causing a processing device to perform steps comprising:
   selecting the set of images depicting the subject at a multitude of angular rotations about a first rotational axis;
   determining a first pair of images where the subject appears at the farthest distance from the first rotational axis and a second pair of images oriented approximately perpendicular to the first pair, wherein the subject in the second pair of images appears aligned most closely to a plane through the first rotational axis;
   determining offset values for these identified image pairs which, when corrected, result in causing the subject to appear centered on or about at least one of the first rotational axis and a second predetermined rotational axis;
   determining interpolated offset values for at least one other image in the set of images based upon the offset values of the first and second pairs of images; and
   transforming at least one of the images in the set of images based on at least one of: the image transformation values, and the interpolated image transformation values.

16. The method of claim 15, further comprising determining offset values for at least one additional image in the image set, and determining interpolated offset values for at least one other additional image based on the at least one additional image as well.

17. The method of claim 16, further comprising the step of optimizing data of the offset values with a data fitting algorithm after interpolation.

18. A computer system for editing a set of images depicting a subject displayed at a plurality of rotational angles comprising:
   means, by a computer, for defining degrees of angular rotation of the subject about a rotational axis;
   means, by the computer, for selecting a subset of images within the set of images based on the degrees of angular rotation of the subject depicted in the subset of images;
   means, by the computer, for determining image transformation values for the subset of images;
   means, by the computer, for determining interpolated image transformation values by interpolating the image transformation values for at least one of the images in the image set based on the image transformation values for the subset of images; and
   means, by the computer, for transforming at least one of the images in the set of images based on at least one of: the image transformation values, and the interpolated image transformation values.

19. The system of claim 18, wherein the transforming means transforms the at least one of the images in the set of images based on both the image transformation values and the interpolated image transformation values.

20. The system of claim 18, further comprising means for outputting edited images as a video file format.

* * * * *